(12) United States Patent
Bochnik et al.

(10) Patent No.: US 7,435,777 B2
(45) Date of Patent: Oct. 14, 2008

(54) LOW-VOC COMPOSITIONS CONTAINING A POLYMERIC LATEX, COATINGS MADE THEREFROM, SUBSTRATES CONTAINING SAME, AND METHODS FOR MAKING SAME

(75) Inventors: Michael Bochnik, Yonkers, NY (US); Yakov Freidzon, Bridgewater, NJ (US); Robert Sheerin, North Caldwell, NJ (US); Ning Wu, Edison, NJ (US)

(73) Assignee: Columbia Insurance Company, Omaha, NE (US)

( * ) Notice: Subject to any disclaimer, the term of this patent is extended or adjusted under 35 U.S.C. 154(b) by 324 days.

(21) Appl. No.: 11/323,622

(22) Filed: Dec. 30, 2005

(65) Prior Publication Data

US 2007/0154646 A1    Jul. 5, 2007

(51) Int. Cl.
*C08L 83/00* (2006.01)

(52) U.S. Cl. .................................................... 524/506
(58) Field of Classification Search .................. 524/506
See application file for complete search history.

(56) References Cited

U.S. PATENT DOCUMENTS

| | | | |
|---|---|---|---|
| 4,489,188 A | 12/1984 | Jones | |
| 4,525,512 A | 6/1985 | Hudson | |
| 4,894,406 A | 1/1990 | Smith | |
| 5,212,229 A * | 5/1993 | Taylor et al. | 524/556 |
| 5,643,669 A * | 7/1997 | Tsuei | 428/354 |
| 5,744,544 A * | 4/1998 | Dunaway et al. | 524/832 |
| 5,756,569 A | 5/1998 | Carver | |
| 5,783,303 A * | 7/1998 | Tsuei | 428/354 |
| 6,027,763 A | 2/2000 | Brown | |
| 6,069,200 A | 5/2000 | Chen | |
| 6,110,998 A | 8/2000 | Slinkard | |
| 6,297,312 B1 | 10/2001 | Wang | |
| 6,306,952 B1 | 10/2001 | Brown | |
| 6,472,028 B1 | 10/2002 | Frazzitta | |
| 6,479,151 B2 | 11/2002 | Butler | |
| 6,586,516 B1 | 7/2003 | Kesselmayer | |
| 6,710,161 B2 * | 3/2004 | Bardman et al. | 528/398 |
| 6,723,779 B2 | 4/2004 | Drujon | |
| 6,762,230 B2 | 7/2004 | Brandenburger et al. | |
| 6,794,434 B2 * | 9/2004 | Collins et al. | 524/366 |
| 6,878,413 B2 | 4/2005 | Frazzitta | |
| 6,933,415 B2 | 8/2005 | Zhao | |
| 2002/0039899 A1 | 4/2002 | Rossman | |
| 2003/0060023 A1 | 3/2003 | Oka et al. | |
| 2004/0161542 A1 | 8/2004 | Ziemann et al. | |
| 2004/0210022 A1 | 10/2004 | Doshi | |
| 2004/0249034 A1 | 12/2004 | Meiners | |
| 2005/0004265 A1 | 1/2005 | Sapper | |

FOREIGN PATENT DOCUMENTS

| | | |
|---|---|---|
| EP | 0599478 | 4/1997 |
| EP | 1170341 B1 | 9/2001 |
| EP | 0789063 | 7/2002 |
| EP | 1447432 | 8/2004 |
| WO | WO 9404581 | 7/1993 |
| WO | WO 0044836 | 8/2000 |
| WO | WO 03060023 | 7/2003 |

OTHER PUBLICATIONS

Vratsanos, Lori A. *Meeting the Challenge of Formulating For the Future*. Air Products Polymers, LP, Allentown PA, 2001. www.airproducts.com/NR/rdonlyres/TP15102623a52udclasgigmhmtsa.pdf.
Ley, Fiori, Quinn. *Optimization of Acrylic Polyols for Low VOC Two-Component Water Reducible Polyurethane Coatings Using Tertiary Isocyanate Crosslinkers*. Cytec Industries Inc., 1937 West Main Street, Stamford, CT 06904 USA www.cytec.com/pdf/progor~1.pdf., 2000.
Fiori, Ley, Quinn. *The Effect of Particle Size Distribution On The Performance of Two Component Water Reducible Acrylic Polyurethane Coatings Using Tertiary Polyisocyanate Crosslinkers*: Cytec Industries Inc., 1937 West Main Street, Stamford, CT 06904 USA. www.cytec.com/pdf/jctword2.pft., 2000.
Blank, Werner J. *The Slow and Winding Road to "Zero" VOC*. King Industries, Inc., Norwalk, CT 06852 USA. www.wernerblank.com/pdfiles/paper26.pdf., 2001.
Mowrer, Norman R. *Polysiloxane Coatings Innovations*. American International Performance Coatings & Finishes Group, Brea, CA., 2004. www.ameroncoatings.com/techcenter/docs/Mowrer%20Polysiloxane%20Ctgs%20Innov.pdf.
Nori, Fujiwara. *Acrylic Resin of a Monoliquid Bridged and Weak Solvent Type for Architectural Paint Uses*. Harima Q, No. 83, pp. 15-18, 2005. (Abstract Only).
Mestach, et al. *A Comparative Study of Water-Borne Coatings for Metal Protection*. Protective Coatings Europe, vol. 9, No. 10, Oct. 2004, pp. 32-34, 36-38. (Abstract Only).
Graves, *Coatings for Compliance*. Prod. Finish, vol. 54, No. 10, Jul. 1990, pp. 56-69. (Abstract Only).
King, *Evaluation of Castor Acrylated Monomer in Acrylic Latexes for One-Component, low-VOC, Low Odor, Ambient Cure, Architectural Coatings*. Dissertation, The University of Southern Mississippi, Director: Shelby F. Thames, 2000. (Abstract Only).
Taumi, *Environmental Problems Relating to the Coating Techniques*. Japan Energy and Technology Intelligence (JETI), vol. 29, No. 6, Jun. 1, 1991, pp. 44-48 (Abstract Only).
Bruen, et al. *Benefits of UV-curable Coatings*. European Coatings Journal, No. 4, 2004, pp. 42-48. (Abstract Only).
Massingill, et al. *Recycling Paint Overspray*. Journal of Coatings Technology, vol. 74, No. 933, Oct. 2002, pp. 143-145. (Abstract Only).
Bruchmann, et al. *Pathways Targeting Solvent-Free PUR Coatings*. Prog. Org. Coatings, vol. 43, No. 1-3, Nov. 2001, pp. 32-40. (Abstract Only).

(Continued)

*Primary Examiner*—Bernard Lipman

(74) *Attorney, Agent, or Firm*—The H.T. Tham Law Group

(57) ABSTRACT

The present invention relates to a coating composition and a method for making same. The coating composition according to the invention can advantageously have a low content of volatile organic compounds and can be used in paint and architectural coatings applications for coating on an appropriate substrate. Methods of formulating the coating compositions according to the invention and methods for forming substrate-bound coatings with improved properties are also described herein.

40 Claims, No Drawings

OTHER PUBLICATIONS

Shahidi, et al. *Amphiphilic Recycled Rubber Particles Used for Surface Coatings*. Conference Paper, Rubber Expo 03: 2003 Technical Meeting of the American Chemical Society, Rubber Division, Oct. 14-17, 2003. (Abstract Only).

Holub, *New Acrylic Dispersions for Minimal VOC High Performance Wood*. Conference Paper, ACT 04, Warsaw, Poland, Nov. 23-26, 2004. (Abstract Only).

Bruen, et al. *Flexible UV Curable Fluoropolymer PU Coatings for Industrial Applications*. PU Magazine, No. 5, Oct.-Nov. 2004, pp. 249-254. (Abstract Only).

Holub, *Novel Acrylic Dispersions for High Performance Coatings at Minimal VOC Demands*. Double Liaison, No. 539, 2004, pp. 24-30. (Abstract Only).

*Reduction of Volatile Organic Compounds in Decorative Paints*. Revista de Plasticos Modernos, 83, No. 549, Mar. 2002, pp. 232-246. (Abstract Only).

Smith, *One Component, Low-VOC, Ambient Cure Architectural Coatings Formulated Using CAM Acrylic Latexes*. Conference Paper, European Coatings Conference: Adhesion and Performance Enhancement, Zurich Switzerland, Sep. 5-6, 2001. (Abstract Only).

Green, *Low-VOC Carbamate Functional Coatings Compositions for Automotive Topcoats*. Journal of Coatings Technology, 73, No. 19, Jul. 2001, pp. 55-62. (Abstract Only).

Kronborg, *Description and Evaluation of Protective Coatings Systems According to ISO 12944*. Pitture Vern., 74, No. 20, Dec. 1998, pp. 25-31. (Abstract Only).

Garcin, *Automotive Industry Seeks PU Paints for Both OEM and Refinishings*. Paint & Ink Int., 11, No. 6, Nov./Dec. 1998, pp. 14-16. (Abstract Only).

*Low-VOC System for Roof Coatings*. Urethanes Technol., 15, No. 2, Apr./May 1998, p. 48 (Abstract Only).

Banov, *Architectural Coatings*. Coatings World, 2, No. 1, Jan./Feb. 1997, pp. 14-16. (Abstract Only).

Kirochko and Kreiner, *A New Water-Borne Fluoroeslastomer Coating*. Surface Coatings International, vol. 84, No. B2, Apr. 2001, pp. 161-164. (Abstract Only).

Holub, *Solution for Minimal Volatile Organic Compound High-Performance Wood Coatings*. Conference Paper, PRA Fourth International Woodcoatings Congress: Developments for a Sustainable Future, The Hague (Netherlands), 2004, Paper 43. (Abstract Only).

Lewandowsi, et al. *Dry-Peelable Temporary Protective Coatings from Water-Borne Self-Crosslinkable Sulphourethane Silanol Dispersions*. Journal of Applied Polymer Science, vol. 91, No. 3, 2004, pp. 1443-1449. (Abstract Only).

Twene, *Development of Volatile Organic compound compliant Binders for Interior Wood Coatings*. Conference Paper, Proc PRA 7th Nurnberg Congress: Creative Advances in Coatings Technology, 2003. (Abstract Only).

Bontinch, *Polyurethanes are the Key to Low Emission Coatings*. Asia-Pacific Coatings Journal, vol. 12, No. 7, 2000. (Abstract Only).

Eaton, *Coating Cross-Linking Reactions Using Cycloaliphatic Epoxides*. Paint & Coatings Ind., vol. 15, No. 6, 1999. (Abstract Only).

Stanley, *High-Solids and Water-Borne Coatings Different But Not Difficult*. Pitture Vernici, vol. 74, No. 7, pp. 31-35, 1998. (Abstract Only).

*Dutch Suggest European Union Directive to Regulate on the Proportion of Solvents in Paints*. DIY Week, No. 5224, 8, 1996. (Abstract Only).

Loos and Thys, *New Developments in Water-Borne Binders for Wood Coatings*. Conference Paper, Proc. XXIII FATIPEC Congress, Brussels, 1996. (Abstract Only).

Becker, et al. *Aqueous Dispersions for High-Quality Paint Systems*. Mod. Paint Coatings, vol. 86, No. 3, 28, 1996. (Abstract Only).

Wood, *Recent Advances in Volatile Organic Compound (VOC)-Compliant Technology for Protective Coatings Applications*. Conference Paper, Proc. PRA 15th International Conference: The Future of Industrial Coatings: Technical Innovation vis-á-vis Legislation, Brussels, Paper 22, 1995. (Abstract Only).

*Urethane Coatings Technology to Stimulate Growth in 1990s*. Chem. Mark. Reporter, vol. 244, No. 15, 1993. (Abstract Only).

\* cited by examiner

LOW-VOC COMPOSITIONS CONTAINING A POLYMERIC LATEX, COATINGS MADE THEREFROM, SUBSTRATES CONTAINING SAME, AND METHODS FOR MAKING SAME

FIELD OF THE INVENTION

The present invention relates to a coating composition and a method for making same. The coating composition according to the invention can advantageously have a low content of volatile organic compounds and can be used in paint and architectural coatings applications for coating on an appropriate substrate.

BACKGROUND OF THE INVENTION

Due to environmental concerns, among other things, there has been a movement toward reducing the amount of volatile organic compounds (VOCs) in paints, stains, and other coating compositions. However, some of the desirable properties of the coating compositions had been negatively affected by the absence of VOCs in those compositions. Companies have recently been searching for formulations and methods of making coating compositions with a low VOC content, but without sacrificing the properties provided by the previous inclusion of VOCs.

Typically, additives that facilitated or caused properties, such as better film coalescence from a latex, better resistance to blocking, better physical and chemical scrub resistance, and tougher coatings, among others, were classified as volatile organic compounds, which evaporated into the environment upon film formation. The evaporation often resulted in undesirable aromas, and exposure to such fumes, particularly in areas that were not well ventilated, was a health concern. Thus, less volatile or non-volatile compounds that impart comparable (or superior) properties are needed to replace VOCs. Some of the efforts focused on decreasing the volatility of the additives. Increasing the molecular weight of the additives and changing the functionality of the additives have also been attempted.

For instance, U.S. Pat. No. 6,762,230 B2 discloses coating compositions containing a latex polymer and dispersible coalescents having a VOC content less than about 50%. The '230 patent describes the dispersible coalescents as preferably having low molecular weight, though the examples indicate their structure as being from a reaction between ϵ-caprolactone and an alcohol or a carboxylic acid. The '230 patent does not disclose the presence of a crosslinking agent.

Previously, latex film drying was facilitated by the presence of a crosslinking agent that would not only help physically coalesce the latex polymers but also chemically crosslink the polymer particles together, typically resulting in stronger films.

U.S. Pat. No. 6,069,200 discloses aqueous curable compositions comprising polymers with sterically hindered alkoxylated silane groups and acid groups blocked by fugitive bases. The '200 patent teaches that these groups can be crosslinked using organometallic catalysts. The compositions of the '200 patent are disclosed to be used as adhesives, sealants, and paints, and are disclosed to have improved properties including solvent resistance, adhesion, hardness, abrasion resistance, and mar resistance. The '200 patent, however, teaches the use of VOCs and does not disclose low-VOC compositions.

U.S. Patent Application Publication No. 2004/0161542 A1 discloses an aqueous composition and method for preparing a non-yellowing coating therefrom. The '542 publication discloses compositions having less than 5 wt % VOCs and discloses that the compositions are useful for preparing crosslinked coatings. The '542 publication also discloses that the polymers in the compositions contain at least one unsaturated fatty acid ester group. In addition, like the '200 patent, the '542 publication discloses crosslinking of the polymers, but through an auto-oxidative mechanism using atmospheric oxygen and the ethylenic double bond from the fatty acid ester. Furthermore, the '542 publication does not disclose some useful additives, such as open time agents.

Thus, there remains a need for low-VOC compositions for use in coatings and related applications that use alternative chemistries and that also improve certain as-applied coating properties without using many VOCs, while maintaining compositional properties and other coating properties at desirable levels.

BRIEF SUMMARY OF THE INVENTION

One aspect of the invention relates to a coating composition comprising a latex containing polymer particles, a crosslinking agent, optionally a pH adjustor, and at least one other additive selected from a coalescing agent, an open time agent, and a combination thereof. The coating composition advantageously comprises a low VOC content, and one of its applications is to be formed into a coating on a substrate.

The present invention relates to a crosslinking agent that serves to crosslink the coalescing agent, the open time agent, or both, such that a coating containing the composition exhibits a low volatility. Without being bound by theory, it is believed that the crosslinking of the additive components by the crosslinking agent in the composition results in improved coating properties over compositions either in which none of the additives or components are crosslinked or in which only the polymer particles are crosslinked.

In some embodiments, the crosslinking agent may not crosslink some of the latex polymer particles, and, in other embodiments, the crosslinking agent may crosslink some of the latex polymer particles, in addition to crosslinking one or more of the additive components.

Although the crosslinking of the composition's components can occur by a variety of mechanisms, in preferred embodiments, the crosslinking does not include, and preferably specifically substantially excludes, oxidative crosslinking. Although the composition can contain any suitable components, in preferred embodiments, the composition does not contain, and preferably specifically substantially excludes, crosslinking monomers and/or monomers that can have one or more ethylenic unsaturations remaining after polymerization.

In a preferred embodiment of the invention, therefore, the crosslinking agent can advantageously comprise at least one, and usually at least two, crosslinkable functional groups that are reactive with corresponding crosslinkable functional groups on (an)other component(s) in the composition.

The present invention also relates to the impact of the crosslinking of the additives on the properties of the coating formed from the composition, particularly on the mechanical, chemical, physical, and physico-chemical properties of the coating. These properties can include, but are not limited to, low temperature coalescence, blocking/film transfer, scrub resistance, chemical rub resistance, pencil hardness, viscosity, wet adhesion, chalk adhesion, tack, scratch resistance, shelf/incubation stability, and the like, and combinations thereof.

Methods of formulating the compositions according to the invention are also disclosed herein, as are coatings containing the compositions according to the invention and substrates/articles coated therewith.

DETAILED DESCRIPTION OF THE INVENTION

One aspect of the present invention relates to a coating composition (e.g., in the form of a latex, dispersion, or emulsion) that contains polymer particles, a crosslinking agent, optionally a pH adjustor, and at least one other additive selected from the group consisting of a coalescing agent, an open time agent, and a combination thereof. The composition, as well as any or all of the components thereof, can have a low VOC content.

Low-VOC compositions and components according to the invention can have a volatile organic compound (VOC) content of not more than about 250 g/L (about 25% w/v), preferably not more than about 150 g/L (about 15% w/v), more preferably not more than about 100 g/L (about 10% w/v), most preferably not more than about 50 g/L (about 5% w/v), for example not more than about 30 g/L (about 3% w/v) or not more than about 20 g/L (about 2% w/v). As referred to herein, VOCs are defined according to U.S. Environmental Protection Agency (EPA) Method 24. Low-VOC compositions can also include "zero-VOC" compositions, which can advantageously have a VOC content of not more than about 10 g/L (about 1% w/v), preferably not more than about 8 g/L (about 0.8% w/v), more preferably not more than about 5 g/L (about 0.5% w/v), for example not more than about 2 g/L (about 0.2% w/v).

As used herein, the terms "polymer" and "polymers" are used to refer to oligomers, homopolymers, copolymers, including random copolymers, statistical copolymers, alternating copolymers, periodic copolymer, bipolymers, terpolymers, quaterpolymers, and other forms of copolymers, as well as adducts thereof, substituted derivatives thereof, and combinations thereof. Such polymers can be linear, branched, hyper-branched, crosslinked, block, di-block, multi-block, graft, isotactic, syndiotactic, stereoregular, atactic, gradient, multi-arm star, comb, dendritic, and/or any combination thereof.

The polymer particles according to the invention are typically in the form of an emulsion, dispersion, and/or latex, generally with a predominantly aqueous suspending and/or dispersive phase (hereinafter "dispersive phase", without intent to limit). The polymer particles according to the invention can advantageously be tailored to their particular application, as desired, and can include, but are not limited to, acrylic-based polymers, styrenic-/acrylic-based polymers, alkyd polymers/resins, urethane-based polymers, urea-based polymers, urethane-/urea-based polymers, or the like, or hybrids thereof, or combinations or blends thereof. In one preferred embodiment, the polymer particles according to the invention can include acrylic-based and/or styrenic-/acrylic-based polymers.

Low-VOC crosslinking agents (and crosslinking agents, in general) can typically include at least one crosslinkable functional group (and usually at least two crosslinkable functional groups) capable of reacting with a corresponding reactive (crosslinkable functional) group on another molecule. Non-limiting examples of crosslinkable functional groups include epoxies, silanes, silane ethers, amines, hydroxyls, carboxylic acids, carboxylates, amides, urethanes, thiourethanes, ureas, thioureas, isocyanates, isothiocyanates, acid halides, aldehydes, anhydrides, and the like, and combinations thereof. In a preferred embodiment, the low-VOC crosslinking agent contains both a silane ether functional group and an epoxy functional group (i.e., an epoxysilane). In another preferred embodiment, the crosslinking agent does not include, and in some preferred embodiments specifically excludes, any compound and/or functional group that participates in, facilitates, or catalyzes oxidative crosslinking (e.g., atmospheric oxygen can cause oxidative crosslinking of pendant ethylenic unsaturations and other residual hydrocarbon double bonds). In another embodiment, the crosslinking agent does not include, and in some embodiments specifically excludes, organometallic catalysts (e.g., titanium carboxy-esters that can ester exchange with crosslinkable groups such as silanes to activate a crosslinking reaction).

The coating compositions according to the invention can contain from about 0.01% to about 5% by weight, for example from about 0.02% to about 4% by weight, from about 0.05% to about 3% by weight, or from about 0.1% to about 2.5% by weight of the crosslinking agent(s).

Examples of low-VOC coalescing agents can include, but are not limited to, fatty acid alkylene glycol monoesters (e.g., those compounds sold under the tradename Archer RC™ from Archer Daniels Midland), aromatic alkoxylates (e.g., cresol propoxylates such as those compounds sold under the tradename PLURACOAT™, including PLURACOAT™ CA120, PLURACOAT™ CA 110, and PLURACOAT™ CA100), those compounds sold under the tradename EDENOL™ from Cognis (e.g., EDENOL™ EFC 100), those compounds sold under the tradename OPTIFILM™ from Eastman Chemical (e.g., OPTIFILM™ Enhancer 400), dialkylene glycols such as dipropylene glycol, trialkylene glycols such as tripropylene glycol, and the like, and combinations thereof. While less preferred, the low-VOC composition can contain traditional (VOC) coalescence solvents, which can include, but are not limited to, 2-ethylhexyl ether of ethylene glycol (e.g., commercially available from Eastman Chemical as Eastman™ EEH solvent), alkyl esters of aromatic carboxylic acids (e.g., 2-ethylhexyl benzoate and/or those compounds sold under the tradename Velate™ 368 from Velsicol Chemical Corp.), methyl carbitol, propylene glycol, ethylene glycol, optionally-alkyl-substituted alkanediol organic carboxylic acid monoesters (e.g., 2,2,4-trimethyl-1,3-pentanediol monoisobutyrate and those compounds sold under the tradename Texanol™ from Eastman Chemical), phosphate salts such as potassium tetrapyrophosphate, plasticizers such as dibutyl phthalate, and the like, and combinations thereof.

When present, the coating compositions according to the invention can contain from about 0.01% to about 10% by weight, for example from about 0.02% to about 8% by weight, from about 0.05% to about 7% by weight, or from about 0.1% to about 5% by weight of the coalescing agent(s).

Open time agents for latex coating compositions are typically compounds having a relatively low molecular weight (e.g., a number average molecular weight from about 1,000 Daltons to about 100,000 Daltons) and containing a relatively high content of hydrophilic functional groups (e.g., hydroxyls, carboxylic acids, and the like, and combinations thereof). In the case of acrylic-based and/or acrylic-/styrenic-based polymer coating compositions, open time agents can generally also be acrylic-based. The relatively high concentration of hydrophilic functional groups can, in some cases, advantageously give open time agents a relatively large hydroxyl number (e.g., at least about 100) and/or acid number. The relatively high concentration of hydrophilic functional groups can also advantageously cause a paint composition, for example, containing the open time agent to have the function of maintaining its viscosity, fluidity, flowability, rewettability and/or brushability for extended periods of time, e.g., to allow a consumer/user sufficient time to coat a surface relatively smoothly and relatively evenly.

Examples of low-VOC open time agents can include, but are not limited to, those compounds sold under the tradename FLOTROL™, FLOETROL™, and/or FLUOTROL™, e.g., from the Flood Company of Hudson, Ohio, those compounds sold by Morgan Associates of Hometown, Pa. under the tradename WONDERWET™, and the like, and combinations thereof.

When present, the coating compositions according to the invention can contain from about 0.01% to about 10% by weight, for example from about 0.02% to about 8% by weight, from about 0.05% to about 7% by weight, or from about 0.1% to about 5% by weight of the open time agent(s).

Examples of pH adjustors useful in the compositions according to the invention can include, but are not limited to, ammonium hydroxide, sodium hydroxide, sodium carbonate, sodium bicarbonate, potassium hydroxide, potassium carbonate, potassium bicarbonate, ammonia, aminoalcohols (e.g., 2-amino-2-methyl-1-propanol and/or those compounds sold under the tradename AMP™ 95 by Angus Chemical Co.), and the like, and combinations thereof. Preferred pH adjustors include ammonia, aminoalcohols, and ammonium salts. In certain cases, compounds that qualify as pH adjustors can be added for purposes other than adjusting pH (e.g., temporary deactivation of otherwise reactive functional groups, emulsion stabilization, or the like), and yet are still characterized herein as pH adjustors.

The compositions according to the invention can advantageously exhibit a pH from about 6 to about 10, for example from about 6.5 to about 8.5 or from about 7.5 to about 9.5, although the pH needs only to be sufficient to maintain the stability of the particular composition, in combination with any additives present.

Crosslinking agents, coalescing agents, and open-time agents that are characterized as being low-VOC typically exhibit a higher molecular weight than other (standard) agents of a similar type, typically contain an increased number of functional groups than other (standard) agents of a similar type, or both. Preferred coalescing agents include those that, regardless of molecular weight, contain at least one or two functional groups capable of reacting with the crosslinking agents present in the compositions according to the invention. Similarly, preferred open time agents include those that, regardless of molecular weight, contain at least two functional groups capable of reacting with the crosslinking agents present in the compositions according to the invention.

Additionally or alternately to the low-VOC versions disclosed above, VOC-designated versions of crosslinking agents, coalescing agents, and/or open time agents may be present in, or added to, the low-VOC compositions according to the invention, so long as the VOC content is within acceptable levels.

In addition, other compounds, e.g., those that are characterized as VOCs as well as those that are not characterized as VOCs, may optionally be present in, or added to, the compositions according to the invention, as desired, e.g., to achieve one or more purposes and/or based on the particular application of the compositions. Non-limiting examples of such compounds include water, surfactant, residual initiator, residual monomer(s), polymer molecular weight control agents, organic solvents, chaser solutions, preservatives, biocides, defoamers, pigments/colorants, anticorrosive agents, dispersants, rheology modifiers, thickeners, UV protectants, buffering agents, pH adjustors, and the like.

Particularly in the case where the polymer particles comprise acrylic- and/or styrenic-/acrylic-based polymers, the polymers according to the invention can predominantly comprise monomers or repeat units that contain relatively unreactive pendant groups, i.e., that do not typically react with the crosslinking agents described herein under standard manufacturing and/or use conditions. Examples of such relatively unreactive monomers can include, but are not limited to, alkyl acrylates, alkyl alkacrylates, alkyl esters of vinyl monocarboxylic organic acids other than acrylates and alkacrylates (e.g. ethyl tiglate, methyl crotonate, and the like), dialkyl esters of vinyl dicarboxylic acids, styrene, alkylstyrenes (e.g., α-ethylstyrene, α-methylstyrene, vinyl toluene, 2,4-dimethylstyrene, 4-t-butylstyrene, and the like), halostyrenes (e.g., α-bromostyrene, 2,6-dichlorostyrene, and the like), isopropenyl esters of saturated, monocarboxylic organic acids (e.g., isopropenyl acetate, isopropenyl isobutyrate, and the like), monoisopropenyl monoalkyl esters of saturated, dicarboxylic organic acids (e.g., isopropenyl alkyl oxalate, isopropenyl alkyl succinate, and the like), vinyl carboxylate alkyl ethers (e.g., vinyl acetate, vinyl propionate, vinyl butyrates, vinyl benzoates, halo-substituted versions thereof such as vinyl chloroacetate, and the like), vinyl alkyl ethers, acrylonitrile, alkacrylonitriles, dialkyl acrylamides, dialkyl alkacrylamides, allyl compounds (e.g., allyl chloride, allyl esters of saturated, monocarboxylic acids, allyl alkyl esters of saturated, dicarboxylic organic acids, and the like), and the like, and combinations thereof. In some preferred embodiments, the relatively unreactive monomers include, but are not limited to, $C_1$-$C_8$ alkyl acrylates, $C_1$-$C_8$ alkyl $C_1$-$C_2$ alkacrylates, styrene, $C_1$-$C_4$ alkylstyrenes, vinyl acetate, and combinations thereof.

As used herein, the prefix "alk" before an ethylenically unsaturated monomer should be understood to indicate an alkyl group, e.g., a $C_1$-$C_6$ hydrocarbon side group, attached to either carbon of the olefinic pendant group, though it usually refers to a group attached to the same carbon as the olefinic pendant group. For example, the most basic alkacrylic acid is methacrylic acid. However, if the "alk" group is on the vinyl carbon not containing the pendant carboxylic acid, then a methacrylic acid becomes crotonic acid, which is contemplated as an alkacrylic acid, as defined herein. Another example includes tiglic acid (i.e., 2-butene-2-carboxylic acid), which is an alkacrylic acid containing two "alk" groups, with one methyl group attached to each vinyl carbon. As used herein, the term "alkyl" should be understood to mean an aliphatic linear or branched $C_1$-$C_{18}$ hydrocarbon moiety. For instance, the monomer ethyl methacrylate has a methyl group attached as an ester to the pendant carboxylate group and an ethyl group attached to the same carbon of the vinyl moiety as the pendant carboxylate (i.e., $CH_2$=C($CH_2CH_3$)—C(=O)O($CH_3$)). As used herein, "alkenyl" should be understood to mean a $C_2$-$C_{18}$ hydrocarbon moiety having a single double bond, preferably a terminal double bond.

In the polymers/polymer particles according to the invention, latex copolymers containing acrylonitrile and/or alkacrylonitriles are known in the art to improve certain physical properties as compared to non-(alk)acrylonitrile-containing copolymers, but can significantly increase cost and can introduce undesirable environmental issues. Thus, in one embodiment, the monomers used in the polymer particles specifically do not include acrylonitrile and alkacrylonitriles. It is believed that non-(alk)acrylonitrile-containing polymers according to the invention can have comparable, or even superior, properties to (alk)acrylonitrile-containing polymers according to the invention with relatively little, if any, increased cost/environmental impact.

Though the glass transition temperature of the polymer that makes up the polymer particles are not believed to be critical parameters and are typically dependent upon the end-use of the latexes, its $T_g$ value can be anywhere from about −50° C. to about 100° C. In one embodiment, the $T_g$ value of the polymer can range from about −40° C. to about 80° C., for example from about −30° C. to about 60° C.

In one embodiment, the $T_g$ value of the polymer particles can be completely calculated by applying Fox's law to known $T_g$ values, e.g., from any edition of the *Polymer Handbook* such as the $3^{rd}$ ed. (1989), of the homopolymers corresponding to each of the monomers used and their respective weight ratios. For descriptions of this method, see, e.g., U.S. Pat. No. 6,723,779 and/or International Publication No. WO 94/04581, the disclosures of both of which are incorporated herein by reference in their entireties.

In some embodiments, the constituent monomers of the polymer particles according to the invention can include substantially no crosslinkable monomers. In a preferred embodiment, the constituent monomers of the polymer particles according to the invention can include substantially no crosslinking monomers. In other embodiments, the constituent monomers of the polymer particles according to the invention can include one or more types of crosslinkable monomers but can include substantially no crosslinking monomers. In another embodiment, the constituent monomers of the polymer particles according to the invention can include crosslinkable monomers, but can be substantially free from those crosslinkable monomers that are reactive with the particular crosslinking agent(s) used in the low-VOC compositions according to the invention.

As used herein, the terms "substantially no" and "substantially free from", referring to a component in a composition, mean that the composition comprises not more than about 1 wt %, preferably not more than about 0.5 wt %, more preferably not more than about 0.1 wt %, most preferably not more than about 0.02 wt %, or in some cases completely none (about 0%), of the component.

As used herein, the term "crosslinkable monomers" should be understood to mean monomers containing one or more pendant functional groups that are relatively stable under the appropriate polymerization conditions but that are subsequently reactive with a crosslinking agent at or after formulation, e.g., upon application to a substrate and/or upon drying/solidification/dispersive phase evaporation (hereinafter "drying" without intent to limit) of a coating layer. As such, crosslinkable monomers can be distinguished from "crosslinking monomers", which are monomers that contain more than one site for propagating a polymerization (i.e., that result in crosslinking of the polymer during polymerization). In some instances, a monomer can be classified as both a crosslinking monomer and a crosslinkable monomer if it has multiple sites for propagating a polymerization (e.g., more than one ethylenic unsaturation) and one or more pendant functional groups that are relatively reactive with a crosslinking agent.

In one embodiment, the constituent monomers of the polymer particles according to the invention can contain less than 1 mol % of crosslinkable monomers. In another embodiment, the constituent monomers of the polymer particles according to the invention can contain less than 0.5 wt % of crosslinkable monomers. In another embodiment, the constituent monomers of the polymer particles according to the invention can include from about 0.1 wt % to about 35 wt %, from about 0.2 wt % to about 30 wt %, from about 0.5 wt % to about 20 wt %, or from about 1 wt % to about 10 wt % of crosslinking and crosslinkable monomers, based on the total monomer content. In another embodiment, the constituent monomers of the polymer particles according to the invention can include from about 0.1 wt % to about 35 wt %, from about 0.2 wt % to about 30 wt %, from about 0.5 wt % to about 20 wt %, or from about 1 wt % to about 10 wt % of only crosslinkable monomers, based on the total monomer content.

Typically, crosslinkable monomers contain one or more crosslinkable functional groups and/or contain one or more heteroatoms (e.g., N, O, S, and combinations thereof), at least one of which heteroatoms is often protonated. Examples of crosslinkable monomers can include, but are not limited to, carboxylic acid-functional monomers such as acrylic acid, ionic acrylate salts, alkacrylic acids, ionic alkacrylate salts, haloacrylic acids, ionic haloacrylate salts, vinyl dicarboxylic organic acids (e.g., itaconic acid, glutaconic acid, maleic acid, angelic acid, fumaric acid, tiglic acid, and the like), monoalkyl esters of vinyl dicarboxylic organic acids (e.g., methyl maleate, ethyl fumarate, and the like), monoisopropenyl esters of saturated, vinyl dicarboxylic organic acids, and the like; polymerizable anhydrides such as maleic anhydride; amino-functional monomers such as aminoalkylstyrenes, aminostyrene, aminoalkyl acrylates, aminoalkyl alkacrylates, aminoalkyl vinyl urethanes, 3-amino-1,2-propylene, and the like; amido-functional monomers such as acrylamide, alkacrylamides, monoalkyl acrylamides, monoalkyl alkacrylamides, alkacrylamidoalkyl ethyleneureas such as those sold under the tradename Sipomer™ WAM from Rhodia, alkenyloxyamidoalkyl ethyleneureas such as those sold under the tradename Sipomer™ WAM from Rhodia, and the like; hydroxy-functional monomers, such as hydroxyalkyl acrylates, hydroxyalkyl alkacrylates, mono- and/or di-hydroxyalkyl acrylamides, mono- and/or di-hydroxyalkyl alkacrylamides, vinyl phenols, hydroxyalkyl vinyl benzenes, only partially esterified acrylate esters of alkylene glycols, only partially esterified acrylate esters of non-polymeric polyhydroxy compounds like glycerol, only partially esterified acrylate esters of polymeric polyhydroxy compounds, vinyl alcohol, and the like; monomers that can have an ethylenic unsaturation remaining after polymerization, such as conjugated dienes, unsaturated fatty acid vinyl esters, unsaturated fatty acid allyl esters, unsaturated fatty acid (alk)acrylate esters, and the like; vinyl ester monomers having a nonionic labile functional group, such as vinyl acetoacetate, allyl acetoacetate, acetoacetyl acrylates, acetoacetyl alkacrylates, acetoacetoxyalkyl acrylates, acetoacetoxyalkyl alkacrylates, di(acetoacetoxy)alkyl acrylates, di(acetoacetoxy)alkyl alkacrylates, mono-acetoacetoxyalkyl acrylamides, mono-acetoacetoxyalkyl alkacrylamides, N,N-diacetoacetoxyalkyl acrylamides, N,N-diacetoacetoxyalkyl alkacrylamides, mono-acetoacrylamides, mono-aceto-alkacrylamides, N,N-diacetoacrylamides, N,N-diaceto-alkacrylamides, vinyl cyanoacetate, allyl cyanoacetate, cyanoacetyl acrylates, cyanoacetyl alkacrylates, cyanoacetoxyalkyl acrylates, cyanoacetoxyalkyl alkacrylates, and the like; mercapto-functional monomers; ureido-functional monomers; thiourea-functional monomers; oxazoline-functional monomers; oxazolidine-functional monomers; monomers containing one or more silane ethers (in one embodiment, preferably at least two or three silane ether functionalities) such as vinyl trialkoxysilanes, vinyl alkyl dialkoxysilanes, vinyl dialkyl alkoxysilanes, and the like; epoxy-functional monomers; and the like, and copolymers and combinations thereof. Additionally or alternately, some examples of crosslinkable monomers are described in U.S. Patent Application Publication No.

2004/0161542 A1, which is incorporated by reference herein in its entirety, although both crosslinkable monomers and crosslinking monomers, as defined herein, are described as "crosslinking monomers" therein.

In the embodiments where the polymer repeat units include ionic salts, their counterions can include, but are not limited to, sodium, potassium, lithium, copper, silver, ammonium, tetraalkyl ammonium, alkyl pyridinium ions such as N-methylpyridinium, tetraalkyl phosphonium ions, tetraaryl phosphonium ions, aralkyl phosphonium ions such as methyltriphenylphosphonium and methyltriphenoxyphosphonium, trialkylsulfonium ions such as trimethylsulfonium, aralkyl sulfonium ions, trialkylsulfoxonium ions such as trimethylsulfoxonium, aralkyl sulfoxonium ions, and the like, and combinations thereof. As used herein, the term "aryl" should be understood to mean an aromatic $C_5$-$C_{18}$ moiety, and the term "aralkyl" should be understood to mean a moiety that is partially aryl and partially alkyl.

In one embodiment, the constituent monomers can be substantially free from monomers that can have one or more ethylenic unsaturations remaining after polymerization such as, but not limited to, conjugated dienes such as butadienes, hexadienes, hexatrienes, octadienes, octatrienes, octatetrenes, as well as hydrocarbon analogs thereof, substituted (e.g., halo- and/or cyano-) derivatives thereof, and the like; mono-, di-, or poly-unsaturated fatty acid esters such as those described in U.S. Patent Application Publication No. 2004/0161542 A1; and the like; and combinations thereof. One reason for this is that monomers having an ethylenic unsaturation remaining after polymerization can cause oxidative crosslinking with atmospheric oxygen sources, which may be undesirable in some cases. Another reason for this is that many monomers that have an ethylenic unsaturation remaining after polymerization are crosslinking monomers, which can be undesirable in some cases. Another reason for this is that conjugated diene monomers, for example, can reduce the polymer glass transition temperature below desirable levels.

Examples of epoxysilane crosslinking agents can include, but are not limited to, epoxysilanes have one silane ether linkage, epoxysilanes have two silane ether linkages such as those sold under the tradename SILQUEST WETLINK™ from GE Advanced Materials, epoxysilanes have three silane ether linkages such as those sold under the tradename COATOSIL™ from OSi Specialties, and the like. In some embodiments, epoxysilanes having two silane ether groups are preferred in the low-VOC compositions according to the invention, as the reactivity of the silane diether with corresponding functional groups such as hydroxyls and carboxylic acids is believed to be higher than the relatively slow reaction rate of silane monoethers therewith and to be lower than the relatively rapid reaction rate of silane triethers therewith. Relatively rapid reactivity of crosslinking agent functional groups with corresponding functional groups on other molecules in the composition (e.g., a silane triether with hydroxyls and/or carboxylic acids) can cause shelf stability problems; as a result, in other embodiments, crosslinking agents that would otherwise exhibit relatively rapid reaction rates (and thus shelf stability issues) can be used in two-pack or multi-pack kits, in which the crosslinking agent(s) can be stored separately from the molecules containing the corresponding functional groups. Additionally or alternately, the epoxysilane crosslinking agent can be grafted onto a polymer backbone, so long as the resulting polymeric crosslinking agent retains at least one functional group capable of reacting with a corresponding reactive group on another molecule.

While typically multiple pigments/colorants are present in end-use latexes that are to be used in paint or architectural coating applications, sometimes only a white pigment, such as a zinc oxide and/or a titanium oxide, is added in the early stages of the formation of the paint composition (e.g., in the grind composition). In such a case, any other desired pigments/colorants of various colors (including more white pigment) can optionally be added at the later stages of, or after, formation of the paint composition. Examples of pigments/colorants that can be useful in the compositions according to the invention can include, but are not limited to, carbon black, iron oxide black, iron oxide yellow, iron oxide red, iron oxide brown, organic red pigments, including quinacridone red and metallized and non-metallized azo reds (e.g., lithols, lithol rubine, toluidine red, naphthol red), phthalocyanine blue, phthalocyanine green, mono- or di-arylide yellow, benzimidazolone yellow, heterocyclic yellow, DAN orange, quinacridone magenta, quinacridone violet, and the like, and any combination thereof. These exemplary color pigments can be added as powders, but can more conveniently be added as aqueous dispersions to paint compositions according to the invention.

Additionally or alternately, extender pigments/colorants can be added, e.g., to the grind composition portion of the paint composition. Examples of extender pigments/colorants useful in paint compositions according to the invention can include, but are not limited to, silica, silicates, carbonates such as calcium carbonates, and the like, and combinations thereof.

Examples of UV protectants used in these compositions can include, but are not limited to UV scavengers, UV absorbers, transparent oxides, UV protective oxides, those compounds sold by Ciba Chemical under the trade name Tinuvin™, and combinations thereof. UV scavengers can include, but are not limited to, hindered amine light stabilizers (HALS). UV absorbers can include, but are not limited to, hydroxybenzophenones, hydroxyphenylbenzotriazoles, oxalanilides, hydroxyphenyl-triazines, and the like, and combinations thereof. Transparent oxides can include, but are not limited to, transparent yellow iron oxides, transparent red iron oxides, those oxides sold by CIUPL of Mumbasa under the tradename Timbasol™ PW 895 and Timbasol™ PW 896, and the like, and combinations thereof. UV-protective oxides can include, but are not limited to UV-protective zinc oxides, UV-protective cerium oxides, those oxides sold by Byk Chemie under the tradename BYK LP™ X), those oxides sold by Nyacol Nano Technologies, Inc., under the tradename Nyacol™ DP5370, and the like, and combinations thereof.

As used herein, a "UV-protective oxide" is an oxide having the primary purpose to inhibit, to reduce, and/or to minimize degradation of a substrate by ultraviolet radiation. For example, the metal oxide UV protectants have similar chemical structure to metal oxides that are used as pigments. Nevertheless, metal oxides (such as the transparent/translucent iron oxides, the UV-protective zinc oxides, the UV-protective cerium oxides, and the like) that are formulated and dimensioned to function primarily as UV protectants and/or that are formulated and dimensioned differently than conventional metal oxide pigments, are classified herein as UV-protective oxides and not as pigments. Without wishing to be bound by any theory, it is believed that UV-protective oxides have a particle size distribution in which substantially, if not all, of the oxide particles and aggregates have dimensions that are smaller than a wavelength of visible light, e.g., not more than about 400 nm, preferably not more than about 380 nm, so as not to significantly affect the path and/or intensity of light. Indeed, the UV-protective oxides discussed herein have alternately been called nano-oxides by others in the relevant technical areas. For instance, micron-sized zinc oxides or slightly smaller, for example, are typically formulated as a conventional white pigment, while UV-protective zinc oxides are formulated primarily as UV protectants.

In embodiments where the crosslinking agent comprises an epoxysilane, it is preferred that the low-VOC composition according to the invention contain substantially no UV-protective oxides with which the epoxysilane can chemically react, (e.g., non-surface-treated UV-protective zinc oxide) to which the epoxysilane can physically and/or chemically adsorb, or both.

The low-VOC compositions according to the invention can exhibit a wide range of viscosities, depending upon the application. In one embodiment, the viscosity of the low-VOC composition can be from about 65 to about 130 Krebunits (KU), preferably from about 70 to about 110 KU, more preferably from about 75 to about 105 KU. While coalescence, degradation, and other factors can cause the viscosity to increase over time, it is preferable that the viscosity not increase beyond about 130 KU, preferably not beyond about 120 KU, more preferably not beyond about 115 KU, and in some cases not beyond about 110 KU.

In practical applications, the low-VOC compositions according to the invention are typically applied to a substrate to form a coating. The substrate may or may not depend upon the product in which the low-VOC compositions according to the invention are used. For example, when the low-VOC compositions are used in a paint composition, the substrate can be, for example, a chalk substrate, wood, a metal, or the like. Examples of suitable substrates can include, but are not limited to: wood, including natural wood, compressed particulate wood, faux or artificial wood, wood composites, and the like, and combinations thereof; metals, including metal alloys, metal composites, coated metals, metallic surfaces, and the like, and combinations thereof; ceramics, including metal oxides, metal nitrides, metal oxynitrides, metal sulfides, metal carbides, and the like, and combinations thereof; transparent and/or translucent substrates such as glasses, polycarbonates, acrylics, styrenics, and the like, and combinations thereof; polymers; woven and/or non-woven fabrics; building materials such as sheet rock, dry wall, and the like; chalky substrates; and the like; and combinations thereof.

In one embodiment, the low-VOC compositions according to the invention can be used as part of a two-pack or a multi-pack coating kit, as disclosed above, which is useful, for example, in architectural coatings and paint formulations. In such an embodiment, the crosslinking agent(s) can be stored separately from one or more of the remaining components in the composition that contain one or more functional groups capable of reacting with the crosslinking agent(s).

In one embodiment, a coating on a substrate that is formed from a coating composition containing a low-VOC composition according to the invention can exhibit superior coating properties when the crosslinking agent functions to at least partially crosslink the low-VOC coalescing agent upon drying.

In another embodiment, a coating on a substrate that is formed from a coating composition containing a low-VOC composition according to the invention can exhibit superior coating properties when the crosslinking agent functions to at least partially crosslink the low-VOC open time agent upon drying.

In another embodiment, a coating on a substrate that is formed from a coating composition containing a low-VOC composition according to the invention can exhibit superior coating properties when the crosslinking agent functions to at least partially crosslink the polymer particles upon drying.

In another embodiment, a coating on a substrate that is formed from a coating composition containing a low-VOC composition according to the invention can exhibit superior coating properties when the crosslinking agent functions to at least partially crosslink both the low-VOC coalescing agent and the low-VOC open time agent upon drying.

In another embodiment, a coating on a substrate that is formed from a coating composition containing a low-VOC composition according to the invention can exhibit superior coating properties when the crosslinking agent functions to at least partially crosslink not only the polymer particles, but also the low-VOC coalescing agent, the low-VOC open time agent, or both, upon drying.

In each of these embodiments, it is believed that the crosslinking of (one or more of) the other components of the composition via the crosslinking agent can yield physical properties in the substrate-bound low-VOC coating that are superior to those low-VOC coatings not similarly crosslinked. The improvements in the coating's physical properties can include, but are not limited to, better low temperature coalescence, decreased blocking/film transfer, increased scrub resistance, increased chemical rub resistance (e.g., to methyl ethyl ketone, or MEK), increased pencil hardness, and the like, and combinations thereof, preferably while maintaining other properties (e.g., compositional viscosity, wet adhesion, chalk adhesion, tack, scratch resistance, shelf/incubation stability, and the like, and combinations thereof) within acceptable levels.

Another aspect of the invention involves a method of making the low-VOC compositions according to the invention. Formulation of the low-VOC compositions according to the invention, as well as coating compositions derived therefrom, can be accomplished by any method known to those in the art. For example, in some embodiments, the latex containing polymer particles can be formulated according to the methods described in commonly-owned, co-pending U.S. patent applications, entitled "Polymers With Improved Shelf Stability" (filed Nov. 30, 2005 as U.S. patent application Ser. No. 11/290,667), "Emulsion Polymers Having Multimodal Molecular Weight Distributions" (filed on even date herewith), and "Translucent Coating Compositions Providing Improved UV Degradation Resistance" (filed on even date herewith).

In one embodiment, the low-VOC crosslinking agent(s) and one or both of the low-VOC coalescing agent(s) and the low-VOC open time agent(s) (whichever low-VOC additive(s) is(are) desired to be present in the composition) can be introduced into a coating composition containing the low-VOC composition according to the invention after formulation of all or most of the other components therein (e.g., in a latex paint composition, after latex polymerization, after grind formulation, after incorporation of the latex, after addition of performance additives, after addition of an anticorrosive agent, if present, after addition of a rheology modifier, if present, optionally after addition of one or more pigments and/or colorants, and optionally after addition of a pH adjustor).

In another embodiment, at least the low-VOC crosslinking agent(s) can be introduced into the low-VOC composition according to the invention after latex polymerization but before formulation of a coating composition containing the low-VOC composition according to the invention (e.g., in a latex paint composition, after latex polymerization, but before grind formulation, before incorporation of the latex, before addition of performance additives, before addition of an anticorrosive agent, if present, before addition of a rheology modifier, if present, and optionally before addition of a pH adjustor). In this embodiment, particularly effective when the polymer particles contain some monomers having functional groups reactive with the crosslinking agent, a low-VOC epoxysilane crosslinking agent can be added during and/or immediately after polymerization of the latex polymer particles, advantageously when the pH of the latex containing the polymer particles is about neutral or slightly basic (i.e., about 6.5 to about 8.5) and/or when the temperature of the latex containing the polymer particles is elevated (i.e., from about 30° C. to about 80° C.). Without being bound by theory, it is believed that the addition of the low-VOC epoxysilane to the polymerizing and/or freshly polymerized polymer particles can result in some level of grafting of the crosslinking agent to the polymer particles, thus resulting in increased stabilization thereof in the low-VOC compositions according to the invention, as well as any coating compositions containing them.

EXAMPLES

The following Examples are merely illustrative of certain embodiments of the invention and contain comparisons of compositions and methods according to the invention with the prior art and/or embodiments not according to the invention. The following Examples are not meant to limit the scope and breadth of the present invention, as recited in the appended claims.

Example 1

Low-VOC Compositions Containing Low-VOC Coalescing Agents With and Without Crosslinkable Functional Groups Example 1 compares the properties of low-VOC compositions containing low-VOC coalescing agents with crosslinkable functional groups (Composition A) and without crosslinkable functional groups (Composition B). The respective low-VOC compositions are shown below in Table 1.

TABLE 1

| Ingredients | Composition A | Composition B |
|---|---|---|
| Paint Composition* | 97 parts | 97 parts |
| Pluracoat ™ CA120 coalescing agent | 2 parts | — |
| Optifilm ™ Enhancer 400 coalescing agent | — | 2 parts |
| Silquest Wetlink ™ 78 crosslinking agent | 1 part | 1 part |

*"Paint Composition" is a styrene-containing, acrylic-based latex paint having a VOC content of about 48 g/L. The latex paint particles also contain about 5 wt % of diacetoacrylamide monomers (that can be crosslinked via hydrazone chemistry, e.g., with ADH, or adipic acid dihydrazide) and about 5 wt % of (alk)acrylic acid functional monomers.

Compositions A and B were both coated as draw downs onto upon panels or other substrate (depending upon the test) and allowed to air dry. After about 1 week to about 4 weeks, the properties of both coatings were measured and are shown below in Table 2.

TABLE 2

| Composition | LTC (~40° F.)[1] [mils] | Blocking Properties[2] | Scrub Resist.[3] [cycles to fail] | MEK Rub Resist.[4] [cycles to fail] | Pencil Hardness[5] |
|---|---|---|---|---|---|
| A | 24 | 0% transfer | 900 | 850 | 3H |
| B | 24 | 100% transfer | 450 | 300 | F |

[1]low-temperature coalescence.
[2]after about 1 week.
[3]after about 1 week; Scrub Resist. after about 2 weeks for Composition A increased to about 1100 cycles.
[4]after about 4 weeks.
[5]after about 2 weeks.

Low-temperature coalescence was measured according to a modified version of ASTM D3793. For each sample, a number of 6"×12" upson panels were cooled to about 40° F. for about 1 hour. On one half (6"×6" portion) of each panel, a draw down coating of each composition was prepared having a thickness starting at about 3 mils and going to about 24 mils. These panels were then kept about 40° F. in a refrigerator for about 24 hours, and were allowed to recover for about ½ hour at room temperature, after which point the panels were left overnight. The presence or absence of visible cracks on each panel was noted and rated from 3 to 24, based on the thinnest panel on which cracks were first evident, with each number represent its mil-thickness, and with 24 representing that either only the 24-mil thick panel or none of the panels showed cracks.

Blocking, or the propensity of a coating to adhere to itself instead of to its substrate, was measured according to a modified version of ASTM D4946. On a sealed white Leneta™ WK card, three 9"-wide draw down coatings of samples of about 3 mils thickness were prepared side by side and allowed to cure for about 1 week at room temperature (e.g., from about 20-25° C.). After curing, each of the three draw down coating samples was cut into four 1" squares. Two of these squares were oriented face to face (i.e., coated sides touching) and are placed under a 100-gram weight in a 120° F. oven for about 24 hours. The other two of these squares were oriented face to face and placed under a 100-gram weight at room temperature for about 24 hours. Both sets of face to face squares were then allowed to equilibrate to ambient temperature for about ½ hour. Each set of squares was then pulled apart using a slow and steady force, forming a T pattern. Blocking was rated on a scale of 1 to 5, with 1 representing no tackiness (which includes both the sound and the feel of separation upon peeling), 2 representing a slight tackiness, 3 representing a moderate tackiness, 4 representing a high level of tackiness, and 5 representing transfer of at least a portion of one of the coatings away from its substrate and onto the other coating. The relative percentage of transfer of the coating was also noted.

Scrub resistance was measured according to a modified version of ASTM D2486 Method B. A scrub panel was created with three 9"-wide draw down coatings of samples of about 7 mils thickness prepared side by side (at least one of the samples should be a control sample) and allowed to cure horizontally for about 2 weeks at room temperature (e.g., from about 20-25° C.). Black scrub panels were preferably used for coating compositions that are white, pastel, and medium colors. In addition, an extra scrub panel was used as a conditioning panel. On a Gardner™ Abrasion Tester, the night before testing, a medium bristle brush was soaked in DI water overnight. Just before the testing, the excess water was shaken from the brush, and the brush was placed in the brush holder. Before testing the scrub panels, the conditioning panel was secured in the Gardner™ Abrasion Tester. With a wooden tongue depressor, about 10 grams of abrasive scrub medium was applied to the brush, and about 5 cc of DI water was syringed evenly across the panel in the area to be scrubbed. The conditioning panel was scrubbed for about 400 cycles. Thereafter, the conditioning panel was removed and discarded, the brush was washed with water, and each scrub panel was secured in the Gardner™ Abrasion Tester. Like with the conditioning panel, the abrasive scrub medium was applied to the brush, and the water was applied to the panel. The scrub panel was then scrubbed for a maximum of about 2000 cycles (typically about 1 hour). About every 100 cycles, excess scrub medium was moved from outside the scrub area to inside the scrub area. About every 400 cycles, another 10 grams of scrub medium is added to the brush, and another 5 cc of DI water was syringed onto the scrub area. The number of cycles it took to remove one continuous line of each coating was noted. This process was repeated for each scrub panel.

MEK rub resistance was measured using double rubs of methyl ethyl ketone according to ASTM D5402-93 on 5-mil draw downs on 3">6" aluminum plates allowed to air dry for about 2 weeks.

Pencil hardness was measured according to a modified version of ASTM D3363. Draw down coatings of each sample were created and allowed to dry at about room temperature. Pencil leads having hardnesses of 6H, 5H, 4H, 3H, 2H, H, F, HB, B, 2B, 3B, 4B, 5B, and 6B (in order of increasing hardness) were abraded flat to an angle of about 90° (e.g., using sandpaper #400) and were oriented at an angle of about 45° to each coating. Starting with the hardest lead, and with the coated substrate at about 25(±2)° C. under about 50(±5)% relative humidity, each pencil was pushed away with a stroke of about ¼" to about ½". Each sample was run in duplicate. The hardness of the first pencil that did not cut or gouge each sample coating was noted.

The results in Table 2 above show that the combination of crosslinking agents in low-VOC compositions with coalescing agents having crosslinkable functional groups (Composition A) resulted in coatings having properties that were markedly better in each of the testing categories above, thus emphasizing the importance of crosslinking of the low-VOC coalescing agent in the compositions according to the invention.

Example 2

Low-VOC Compositions Containing a Coalescing Agent Having Crosslinkable Functional Groups With and Without a Crosslinking Agent Example 2 compares the properties of low-VOC compositions containing low-VOC coalescing agents having crosslinkable functional groups with an epoxysilane crosslinking agent (Composition A) and without an epoxysilane crosslinking agent (Composition C). The respective low-VOC compositions are shown below in Table 3.

TABLE 3

| Ingredients | Composition A | Composition C |
|---|---|---|
| Paint Composition 1B* | 97 parts | 98 parts |
| Pluracoat ™ CA120 coalescing agent | 2 parts | 2 parts |
| Silquest Wetlink ™ 78 crosslinking agent | 1 part | — |

*Paint Composition 1B is a styrene-containing, acrylic-based latex paint having a VOC content of about 48 g/L. The latex paint particles also contain about 5 wt % of diacetoacrylamide monomers (that can be crosslinked via hydrazone chemistry, e.g., with ADH, or adipic acid dihydrazide) and about 5 wt % of (alk)acrylic acid functional monomers.

Compositions A and C were both coated as draw downs onto upson panels or other substrate (depending upon the test) and allowed to air dry, as in Example 1. After about 1 week, the properties of both coatings were measured and are shown below in Table 4.

TABLE 4

| Composition | LTC (~40° F.)[1] [mils] | Blocking Properties[2] | Scrub Resist.[3] [cycles to fail] | MEK Rub Resist.[4] [cycles to fail] |
|---|---|---|---|---|
| A | 24 | 0% transfer | 900 | 850 |
| C | 16 | 100% transfer | 300 | 40 |

[1]low-temperature coalescence.
[2]after about 1 week.
[3]after about 1 week; Scrub Resist. after about 2 weeks for Composition A increased to about 1100 cycles.
[4]after about 4 weeks.

The results in Table 4 show that the presence of an epoxysilane crosslinking agent in a low-VOC composition containing a coalescing agent having crosslinkable functional groups (Composition A) resulted in coatings having properties that were markedly better in each of the testing categories above than without the crosslinking agent (Composition C), thus emphasizing the importance of crosslinking of the low-VOC coalescing agent in the compositions according to the invention.

Example 3

Incubation Stability of Low-VOC Composition According to the Invention

Example 3 compares the properties of a low-VOC composition according to the invention containing a low-VOC coalescing agent having crosslinkable functional groups and an epoxysilane crosslinking agent (Composition A) that is made into a coating shortly after formulation and that is made into a coating after about 4 weeks of incubation at about 50° C. The two samples of Composition A were coated as draw downs onto upson panels or other substrate (depending upon the test) and allowed to air dry, as in Example 1. The properties of both coatings were measured at various times after the coatings were prepared and are shown below in Table 5.

TABLE 5

| Composition | LTC (~40° F.)[1] [mils] | Blocking Properties[2] | Scrub Resist.[3] [cycles to fail] | Viscosity [Krebunits] |
|---|---|---|---|---|
| A (as formulated) | 24 | 0% transfer | 1100 | 87 |
| A (4 wks later) | 24 | 0% transfer | 1000 | 88 |

[1]low-temperature coalescence.
[2]after about 1 week.
[3]after about 2 weeks.

The results in Table 5 show that a low-VOC composition containing a coalescing agent having crosslinkable functional groups and an epoxysilane crosslinking agent that had been exposed to each other in the composition for about 4 weeks at elevated temperature resulted in coatings having properties that were comparable in each of the testing categories above to the as-formulated composition coated shortly after forming the composition. These results, in comparison with the results of the other Examples, indicate the stability of the epoxysilane crosslinking agent in the formulation, even after about 4 weeks at elevated temperature in the presence of the reactive functional groups on the low-VOC coalescing agent in a low-VOC composition according to the invention.

While various embodiments of the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

The invention claimed is:

1. A coating composition comprising:
   a latex comprising polymer particles made from constituent monomers that are substantially free from crosslinking monomers;
   a first additive component comprising a crosslinking agent having one or more crosslinkable functional groups;
   optionally a pH adjustor; and
   a second additive component selected from the group consisting of a coalescing agent, an open time agent, and a combination thereof,
   wherein the coating composition has a volatile organic compound content of not more than about 50 g/L.

2. The coating composition of claim 1, wherein the crosslinking agent comprises a low-VOC epoxysilane.

3. The coating composition of claim 2, wherein the crosslinking agent is present in an amount from about 0.1% to about 2.5% by weight.

4. The coating composition of claim 1, wherein the composition comprises a low-VOC coalescing agent.

5. The coating composition of claim 1, wherein the composition comprises a coalescing agent having one or more crosslinkable functional groups reactive with the one or more crosslinkable functional groups of the crosslinking agent.

6. The coating composition of claim 5, wherein the coalescing agent is present in an amount from about 0.1% to about 5% by weight.

7. The coating composition of claim 1, wherein the composition comprises an open time agent having one or more crosslinkable functional groups reactive with the one or more crosslinkable functional groups of the crosslinking agent.

8. The coating composition of claim 7, wherein the open time agent is present in an amount from about 0.1% to about 5% by weight.

9. The coating composition of claim 1, wherein the constituent monomers have a combined content of crosslinking monomers and crosslinkable monomers is:
   (i) less than 1 mol %,
   (ii) less than 0.5 wt %, or
   (iii) both.

10. The coating composition of claim 1, wherein the coating composition is substantially free from unsaturated fatty acid esters.

11. A coating composition comprising:
    a latex comprising polymer particles made from constituent monomers, of which the combined content of crosslinking monomers and crosslinkable monomers is
    (i) less than 1 mol %,
    (ii) less than 0.5 wt %, or
    (iii) both;
    a first additive component comprising a crosslinking agent having one or more crosslinkable functional groups;
    optionally a pH adjustor; and
    a second additive component selected from the group consisting of a coalescing agent, an open time agent, and a combination thereof,
    wherein the coating composition has a volatile organic compound content of not more than about 50 g/L.

12. The coating composition of claim 11, wherein the crosslinking agent comprises a low-VOC epoxysilane.

13. The coating composition of claim 12, wherein the crosslinking agent is present in an amount from about 0.1% to about 2.5% by weight.

14. The coating composition of claim 11, wherein the composition comprises a low-VOC coalescing agent.

15. The coating composition of claim 11, wherein the composition comprises a coalescing agent having one or more crosslinkable functional groups reactive with the one or more crosslinkable functional groups of the crosslinking agent.

16. The coating composition of claim 15, wherein the coalescing agent is present in an amount from about 0.1% to about 5% by weight.

17. The coating composition of claim 11, wherein the composition comprises an open time agent having one or more crosslinkable functional groups reactive with the one or more crosslinkable functional groups of the crosslinking agent.

18. The coating composition of claim 17, wherein the open time agent is present in an amount from about 0.1% to about 5% by weight.

19. The coating composition of claim 11, wherein the coating composition is substantially free from unsaturated fatty acid esters.

20. The coating composition of claim 11, wherein the constituent monomers are substantially free from crosslinking monomers.

21. A low-VOC coating composition comprising:
    a latex comprising polymer particles made from constituent monomers;
    a first additive component comprising a crosslinking agent having one or more crosslinkable functional groups;
    optionally a pH adjustor; and
    a second additive component selected from the group consisting of a coalescing agent, an open time agent, and a combination thereof,
    wherein the coating composition is substantially free from unsaturated fatty acid esters.

22. The coating composition of claim 21, wherein the crosslinking agent comprises a low-VOC epoxysilane.

23. The coating composition of claim 22, wherein the crosslinking agent is present in an amount from about 0.1% to about 2.5% by weight.

24. The coating composition of claim 21, wherein the composition comprises a low-VOC coalescing agent.

25. The coating composition of claim 21, wherein the composition comprises a coalescing agent having one or more crosslinkable functional groups reactive with the one or more crosslinkable functional groups of the crosslinking agent.

26. The coating composition of claim 25, wherein the coalescing agent is present in an amount from about 0.1% to about 5% by weight.

27. The coating composition of claim 21, wherein the composition comprises an open time agent having one or more crosslinkable functional groups reactive with the one or more crosslinkable functional groups of the crosslinking agent.

28. The coating composition of claim 27, wherein the open time agent is present in an amount from about 0.1% to about 5% by weight.

29. The coating composition of claim 21, wherein the constituent monomers have a combined content of crosslinking monomers and crosslinkable monomers is:
   (i) less than 1 mol %,
   (ii) less than 0.5 wt %, or
   (iii) both.

30. The coating composition of claim 21, wherein the constituent monomers are substantially free from crosslinking monomers.

31. A low-VOC coating composition comprising:
   a latex comprising polymer particles made from constituent monomers;
   a low-VOC crosslinking agent having at least two crosslinkable functional groups;
   a low-VOC coalescing agent having at least two crosslinkable functional groups, each of which are reactive with at least one of the crosslinkable functional groups of the low-VOC crosslinking agent;
   a low-VOC open time agent having at least two crosslinkable functional groups, each of which are reactive with at least one of the crosslinkable functional groups of the low-VOC crosslinking agent; and
   optionally a pH adjustor.

32. The coating composition of claim 31, wherein the crosslinking agent comprises a low-VOC epoxysilane.

33. The coating composition of claim 32, wherein the crosslinking agent is present in an amount from about 0.1% to about 2.5% by weight.

34. The coating composition of claim 32, wherein the coalescing agent is present in an amount from about 0.1% to about 5% by weight.

35. The coating composition of claim 32, wherein the open time agent is present in an amount from about 0.1% to about 5% by weight.

36. The coating composition of claim 32, wherein the constituent monomers have a combined content of crosslinking monomers and crosslinkable monomers is:
   (i) less than 1 mol %,
   (ii) less than 0.5 wt %, or
   (iii) both.

37. The coating composition of claim 32, wherein the coating composition is substantially free from unsaturated fatty acid esters.

38. The coating composition of claim 32, wherein the constituent monomers are substantially free from crosslinking monomers.

39. A method for formulating a crosslinked coating comprising:
   (a) forming a coating composition comprising the steps of
      polymerizing polymer particles in a latex emulsion from one or more types of constituent monomers;
      adding a first additive component comprising a crosslinking agent with one or more crosslinkable functional groups to the latex emulsion during polymerization, immediately after polymerization, or both to form a crosslinkable composition, without significantly crosslinking the polymer particles in the latex emulsion;
      formulating a grind composition;
      adding the crosslinkable composition to the grind composition to form a coating composition;
      optionally adding to the coating composition one or more of a performance additive, an anticorrosive agent, a rheology modifier, a pH adjustor, water, and a combination thereof; and
      adding to the coating composition a second additive component selected from the group consisting of a coalescing agent having one or more crosslinkable functional groups that are reactive with the one or more crosslinkable functional groups of the crosslinking agent, an open time agent having one or more crosslinkable functional groups that are reactive with the one or more crosslinkable functional groups of the crosslinking agent, and a combination thereof;
   (b) applying the coating composition to a substrate; and
   (c) drying the coating composition on the substrate, or allowing it to dry, thereby forming a crosslinked coating,
   wherein the drying of the coating composition facilitates and/or causes the one or more crosslinkable functional group(s) of the crosslinking agent to react with the one or more crosslinkable functional groups of the second additive component(s).

40. A method for improving the properties of a coating disposed on a substrate, which method comprises the steps of:
   (a) incorporating into a coating composition:
      a first additive component comprising a crosslinking agent with one or more crosslinkable functional groups;
      a second additive component selected from the group consisting of: (i) a coalescing agent having one or more crosslinkable functional groups that are reactive with the one or more crosslinkable functional groups of the crosslinking agent, (ii) an open time agent having one or more crosslinkable functional groups that are reactive with the one or more crosslinkable functional groups of the crosslinking agent, and (iii) a combination thereof; and
      optionally a pH adjustor;
   (b) applying the coating composition to a substrate; and
   (c) drying the coating composition on the substrate, or allowing it to dry, thereby forming a coated substrate,
   wherein the drying of the coating composition facilitates and/or causes the one or more crosslinkable functional group(s) of the crosslinking agent to react with the one or more crosslinkable functional groups of the second additive component(s), thus resulting in the coating on the coated substrate having improvements in one or more of the following properties: low temperature coalescence, blocking/film transfer, scrub resistance, chemical rub resistance, pencil hardness, viscosity, wet adhesion, chalk adhesion, tack, scratch resistance, shelf/incubation stability, and a combination thereof.

* * * * *